United States Patent
Cole et al.

[15] 3,678,937

[45] July 25, 1972

[54] DEMAND CARDIAC PACER WITH INTERFERENCE PROTECTION

[72] Inventors: Addison D. Cole, Natick; Roger S. Smith, North Andover, both of Mass.

[73] Assignee: Adcole Corporation, Waltham, Mass.

[22] Filed: June 1, 1970

[21] Appl. No.: 41,880

[52] U.S. Cl. ......................................................128/419 P
[51] Int. Cl. ......................................................A61n 1/34
[58] Field of Search ..................128/421, 422, 419 P, 2.06 A, 128/2.06 F, 2.06 R

[56] References Cited

UNITED STATES PATENTS 3,528,428  9/1970  Berkovits..............................128/419 P
2,492,617  12/1949  Boland et al........................128/2.06 F

FOREIGN PATENTS OR APPLICATIONS 1,264,680  3/1968  Germany..........................128/2.06 F

*Primary Examiner*—William E. Kamm
*Attorney*—Rich & Ericson

[57] ABSTRACT

A demand cardiac pacer comprising a relaxation oscillator for applying hart-stimulating pulses to a pair of electrodes at a rate somewhat less than the lowest rate of natural heartbeats, and a timing circuit for measuring the interval between voltage pulses on the electrodes produced either by the oscillator, by natural heart signals, or by noise signals, for disabling the oscillator when natural heart pulses are received at a rate in the normal range, and for enabling the oscillator in the presence of noise signals above a certain frequency range.

17 Claims, 3 Drawing Figures

Patented July 25, 1972

Inventors
ADDISON D. COLE
ROGER S. SMITH
By Rich & Ericson
Attorneys

Patented July 25, 1972

Inventors
ADDISON D. COLE
ROGER S. SMITH
by Rich & Ericson
Attorneys

DEMAND CARDIAC PACER WITH INTERFERENCE PROTECTION

My invention relates to cardiac pacers, and particularly to a novel demand pacer, Implantable demand cardiac pacers have been developed for supplementing the action of a defective normal heart. Such a pacer conventionally comprises a form of relaxation oscillator having a period somewhat longer than the expected period of a natural heartbeat, coupled electrically to the heart to receive electrical heart signals produced in the body in the normal operation of the heart, and to supply stimulating pulses to the myocardium in the absence of natural pulses.

The naturally occuring heart wave is conventionally divided into P, Q, R, S and T waves for purposes of description and analysis. Of these, the R wave is generally the strongest and is usually selectively sensed as a measure of the heart rate. In conventional pacers, a circuit is provided that resets the oscillator each time a natural heartbeat is produced, so that the oscillator does not operate to produce output pulses so long as natural R waves are detected at a sufficient rate. In the absence of such natural heart pulses, the oscillator begins to operate to supply stimulating pulses at a fixed rate, below the normal heart rate, but sufficiently high to maintain an adequate blood supply for minimal activity. It has been found that such apparatus is subject to improper operation in the presence of noise signals that may be coupled into the sensing circuits, or picked up by the sensing and stimulating electrodes. The object of my invention is to make the operation of demand pacers more reliable in the presence of electrical noise.

Briefly, the above and other objects of my invention are obtained by a novel demand pacer circuit construction in which the rate of occurrence of electrical pulses on the sensing and stimulating electrodes is compared with the normal rate. Circuit means are provided to apply stimulating pulses to the electrodes at a fixed rate below the natural rate if pulses occur on the electrodes at a rate that is either above the normal rate or below it. Pulses occurring above the normal rate are usually electrical noise, whereas an episode of heart block will result in pulses below the normal rate. The apparatus includes a resettable relaxation oscillator having a fixed period somewhat greater than the normally expected heartbeat rate. The oscillator is coupled to a pair of electrodes that are adapted to be connected in the heart circuit, both to receive naturally occuring heart signals, and to apply stimulating pulses when desired. A pulse rate sensing circuit is provided to reset the oscillator without producing an output pulse so long as heartbeats occur at a normal rate. An inhibiting circuit is provided to prevent the operation of this resetting circuit in the process presence of pulses occuring at a greater rate than normal due to noise interference.

The manner in which the apparatus of my invention is constructed, and its mode of operation, will best be understood in the light of the following detailed description, together with the accompanying drawings, of a preferred embodiment thereof.

Figure 1:
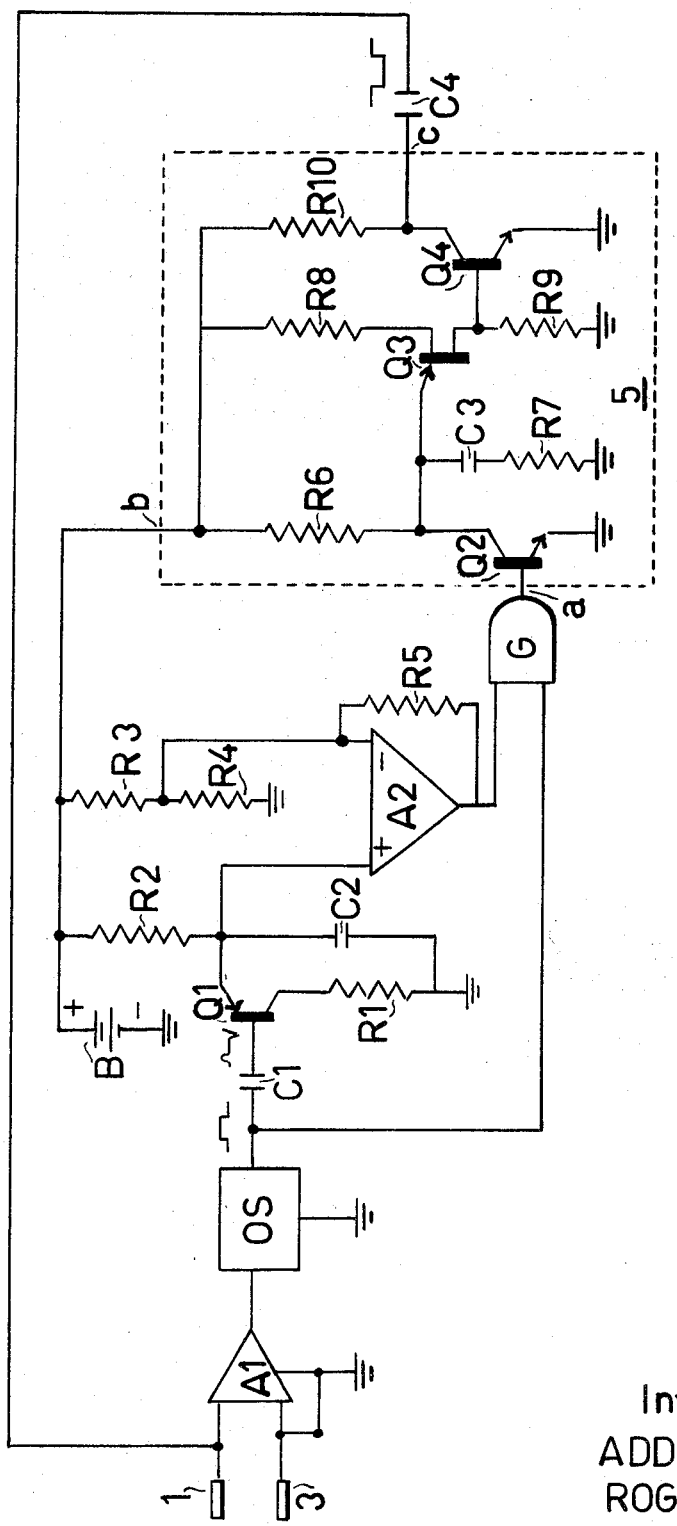
FIG. 1 is a schematic wiring diagram of a demand pacer in accordance with one embodiment of my invention.

Referring to the drawings, FIG. 1 shows a heart sensing and stimulating circuit including a pair of electrodes 1 and 3. One of these electrodes, such as the electrode 1, is adapted to be directly connected to the heart, as by implantation in the ventricle. The other electrode, such as the electrode 3, may be connected elsewhere, essentially at any convenient location in the body that will serve as a return. For convenience, and not to indicate any necessary circuit conditions, the electrode 3 has been indicated as at a reference ground.

The electrodes 1 and 3 are connected to the input terminals of a conventional amplifier A1. The amplifier A1 preferably includes suitable limiting and wave-shaping circuits to detect the leading edge of the R wave without responding to the P, Q, S, and T waves produced by the body.

The amplifier A1 is arranged to trigger a conventional one-shot multivibrator OS at the leading edge of each such R wave detected. Inherently, the amplifier will also respond to any noise signal occurring across the electrodes 1 and 3 that is sufficiently similar in amplitude and waveform to the R wave, or to random noise signals coupled into the amplifier circuits. When triggered, the one-shot multivibrator OS produces a positive rectangular pulse of fixed duration on its output terminal.

The output terminal of the multivibrator OS is connected through a capacitor C1 to the base of a pnp transistor Q1. The output terminal of the one-shot multi-vibrator is also connected to one input terminal of a two-input terminal AND gate G. The gate G may be of any conventional construction.

The collector of the transistor Q1 is returned to ground through a resistor R1. The emitter of the transistor Q1 is returned to ground through a capacitor C2, and to the positive terminal of a suitable source of potential, here indicated as a battery B, through a resistor R2. The negative terminal of the battery B is grounded, as shown.

The resistor R1 may be any convenient small value that will protect the transistor Q1 against damage upon discharge of the capacitor C2. The time constant of the resistor R1 and the capacitor C2 should be selected to be relatively small with respect to the time constant R2C2.

The emitter of the transistor Q1 is also connected to the non-inverting input terminal of a conventional operational amplifier A2. The inverting input terminal of the amplifier A2 is connected to the junction of a pair of resistors R3 and R4. As shown, these resistors are connected between the positive terminal of the battery B and ground. The amplifier A2 is provided with a conventional feedback resistor R5, and has its active output terminal connected to the second input terminal of the gate G.

The gate G may be of the type which produces a positive potential at its output terminal when and only when positive input signals are applied to both input terminals. Assuming that construction, the apparatus so far described serves as a pulse rate comparator that will produce a positive output signal on the output terminal of the gate G when and only when electrical pulses effective to trigger the one-shot multivibrator OS through the amplifier A1 appear on the electrodes 1 and 3 at a rate below a predetermined rate.

It will be seen that the transistor Q1 is normally unbiased, and will thus be cut off in the absence of a pulse applied from the multivibrator through the capacitor C1. In that state, the capacitor C2 will be charged through the resistor R2.

During each pulse produced by the one-shot multivibrator OS, the AND gate G will be enabled. At the trailing edge of each such pulse, a negative going transition will be applied to the base of the transistor Q1 through the capacitor C1, and the transistor Q1 will be turned on, discharging the capacitor C2 through the resistor R1. If, prior to that discharge, the potential at the emitter of the transistor Q1 rises above the potential at the junction of the resistors R3 and R4, the amplifier A2 will produce a positive input signal to the gate G, causing it to produce a positive output voltage.

The voltage at the emitter of the transistor Q1, when the one-shot pulse is produced, depends on the time delay after the previous pulse that discharged the capacitor C2. The value of voltage reached at the emitter of the transistor Q1 between such discharging pulses is determined by the value of the resistor R2 and the capacitor C2, together with the voltage of the battery B. These components are selected so that the gate G will produce a positive output signal if the one-shot OS is triggered at a rate not more than the expected maximum rate of natural heartbeats, but will not be produced if the one-shot is triggered at a higher rate.

The active output terminal of the gate G is connected to the base of an npn transistor Q2. The emitter of the transistor Q2 is connected to ground, and its collector is returned to the positive terminal of the battery B through a resistor R6. The collector of the transistor Q2 is returned to ground through a capacitor C3 and a resistor R7 in series.

The collector of the transistor Q2 is connected to the emitter of a unijunction transistor Q3. One base of the unijunction transistor Q3 is connected to ground through a resistor R9, and the other base is returned to the positive terminal of the battery B through a resistor R8.

The base of the transistor Q3 that is more remote from the emitter, that is, the base normally termed "base one", is connected to the base of an npn transistor Q4. The emitter of the transistor Q4 is grounded. The collector of the transistor Q4 is returned to the positive terminal of the battery B through a resistor R10. The collector of the transistor Q4 is connected to the sensing and stimulating electrode 1 through a capacitor C4. As will appear, the transistor Q4 serves as an electronic switch.

The circuits comprising the transistors Q3 and Q4 form a resettable relaxation oscillator 5. So long as the transistor Q2 is cut off, the capacitor C3 will be charged through the resistors R6 and R7 until the unijunction transistor Q3 fires and discharges the capacitor C3 through the resistors R7 and R9. However, if the gate G produces a positive signal biasing the transistor Q2 into conduction, before the unijunction transistor Q3 fires, the capacitor C3 will be discharged through the resistor R7. The resistor R7 is chosen to be small with respect to the resistor R6, so that the resistor R6 and capacitor C3 essentially determine the frequency of oscillation. The resistor R7 merely protects the transistor Q2 against excessive current.

The resistor R9 is chosen to be relatively small with respect to the resistor R6, so that the fall time of the oscillator output waveform is relatively short compared to the rise time. During the discharge of the capacitor C3 through the unijunction transistor Q3 and the resistors R7 and R9, the transistor Q4 is biased into conduction and brings its collector essentially to ground potential. The result is that a stimulating pulse is applied to the electrode 1 each time the unijunction transistor is fired. The resistor R6 and the capacitor C3 are selected so that the period of oscillation of the relaxation oscillator in the free-running state is somewhat more than the longest interval between naturally occurring heartbeats.

The apparatus of FIG. 1 may be encapsulated in any conventional manner to adapt it for implantation in the body of the patient. It will be apparent to those skilled in the art that the circuit of FIG. 1 is readily adapted for construction with conventional miniature circuit techniques.

Figure 2:
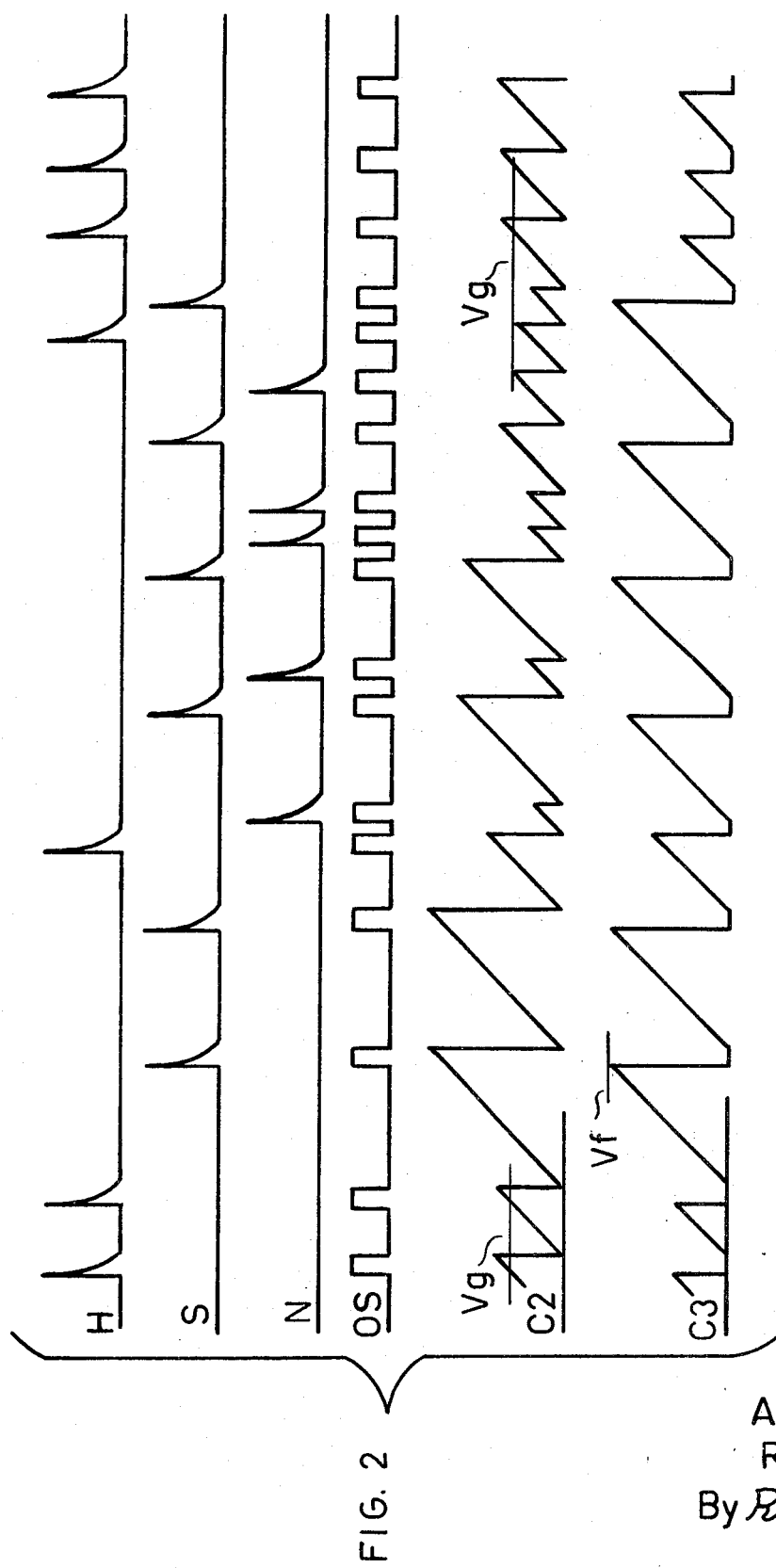
FIG. 2 is a composite graph of idealized waveforms occuring during the operation of the apparatus of FIG. 1 under various conditions.

Having described the construction of the apparatus of FIG. 1, its operation under various typical conditions will next be described in connection with the waveform diagrams of FIG. 2. In FIG. 2, pulses produced by the amplifier A1 in response to naturally occuring R waves are identified by H. Stimulating pulses produced by the apparatus of FIG. 1 are identified by S. Pulses labeled N represent noise that may occur at any time, either in the form of stray electrical signals across the electrodes 1 and 3, or as noise coupled into the internal circuits of the amplifier A1.

Note that all pulses in FIG. 2 have been shown as of the same polarity, for convenience. The pulse produced by the circuit of FIG. 1 on the electrode 1 in response to operation of the oscillator comprising the unijunction transistor Q3 is negative, as shown. However, it will be apparent to those skilled in the art that the important consideration is that the electrodes selected for connection into the myocardium should apply stimulating pulses of the same polarity as those produced by the natural heart. That can be readily accomplished in any particular case by properly choosing one of the electrodes 1 and 3 for connection to the myocardium.

As indicated in FIG. 2, the one-shot multivibrator OS produces an output pulse each time any of the H, S or N pulses is produced. The capacitor C2 is charged through the resistor R2 until, at the trailing edge of each pulse produced by the one-shot multivibrator OS, it is discharged. The gate G is enabled during each output pulse produced by the one-shot multivibrator OS. The gate will produce a positive output signal biasing the transistor Q2 into conduction if the voltage across the capacitor C2 reaches a predetermined value, identified as Vg in FIG. 2, during the pulse produced by the multivibrator OS. As indicated for the first two naturally occurring heart pulses H, the circuit is so adjusted that this voltage Vg is exceeded if the pulses H occur at a normal rate.

The capacitor C3 is charged until the leading edge of each pulse produced by the multivibrator OS. As indicated for the first two pulses H, the capacitor C2 will be charged enough between pulses so that the gate G will be enabled when the multivibrator OS produces its output pulse, causing the capacitor C3 will be discharged. It will remain discharged until the end of the the pulse produced by the multivibrator OS, and then begin to charge again.

FIG. 2 illustrates the situation in which a heart block episode occurs after the first two naturally occurring R waves, so that the capacitors C2 and C3 are not discharged until the unijunction transistor Q3 reaches the firing point, labeled Vf in FIG. 2. When that occurs, the transistor Q4 will be biased into conduction, causing a pulse S to be produced across the electrodes 1 and 3. That pulse will trigger the multivibrator OS, causing it to produce a pulse and discharge the capacitor C2 at the trailing edge of the pulse.

Referring again to FIG. 2, there is illustrated the situation in which the first stimulating pulse S is not followed by a naturally occuring heartbeat. In that case, another stimulating pulse S is produced when the capacitor C3 again charges to the firing voltage Vf through the transistor Q3. As before, the multivibrator OS is triggered by this pulse and then discharges the capacitor C2.

The next situation illustrated in FIG. 2 is a naturally occurring heartbeat following the second stimulating pulse S and being followed in turn by a noise pulse N. As illustrated, the interval between the stimulating pulse S and the naturally produced pulse H is sufficient to allow the capacitor C2 to charge well above Vg, so that the transistor Q2 is biased into conduction by the gate G and the capacitor C3 is discharged before the unijunction transistor Q3 is fired. The closely following noise pulse N will trigger the multivibrator OS. The pulse produced by the multivibrator finds the capacitor C2 at a voltage well below Vg, so that the capacitor C3 continues to charge and the gate G is not operated to turn on the transistor Q2. Accordingly, the stimulating pulse S will be produced at the same interval after the natural pulse H as though the noise pulse had not intervened.

The next situation illustrated in FIG. 2, following the third pulse S, is a noise pulse N closely following the pulse S. That will cause the capacitor C2 to be discharged before it can operate the gate G, so that the capacitor C3 will continue to charge until it reaches the firing voltage Vf for the transistor Q3. If noise pulses continue to occur, as illustrated for the pair following the fourth pulse S, the capacitor C2 will be repeatedly discharged, and the unijunction transistor Q3 will be fired at intervals corresponding to the basic oscillator rate set by the resistor R6 and the capacitor C3. Regardless of the sources of the pulses on the electrodes 1 and 3, or at the output of the amplifier A1 as the result of stray coupling, pulses S will be continued to be produced at the basic minimum rate so long as there are either noise or natural pulses at a rate greater than the predetermined maximum rate of natural pulses. Thus, as illustrated by the portion of FIG. 2 following the fifth pulse S, the system will ignore a natural heart pulse H if a noise pulse N occurs that will prevent the capacitor C2 from charging to the voltage Vg. Only when natural heart pulses are produced at a normal rate, as illustrated for the last three pulses H, will the oscillator fail to produce stimulating pulses S at the basic interval assigned.

Figure 3:
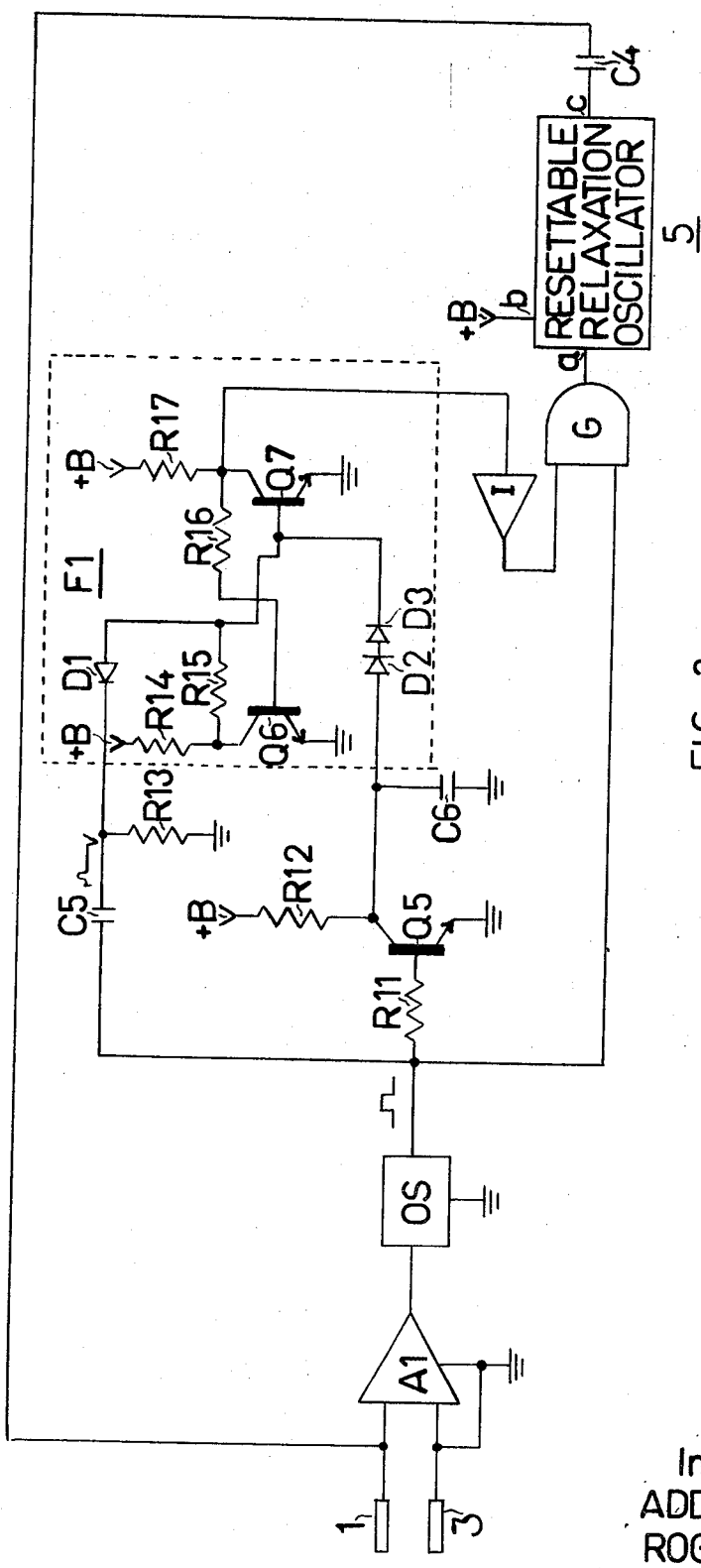
FIG. 3 is a schematic wiring diagram of a demand pacer accordance with another embodiment of my invention.

FIG. 3 shows a modification of the circuit of FIG. 1. In FIG. 3, the electrodes 1 and 3, the amplifier A1, the multivibrator OS, the gate G, the resettable relaxation oscillator 5 and the capacitor C4 may be of the same construction, and perform the same functions, as the correspondingly designated components of FIG. 1. The pulse rate determining network is modified, and will next be described.

In FIG. 3, the output terminal of the multivibrator OS is connected to ground through a capacitor C5 in series with a resistor R13. The negative pulse produced across the resistor R13 at the trailing edge of each pulse produced by the one-shot multivibrator OS is used to set a flip-flop generally designated F1, and to be described in more detail below.

The output terminal of the multivibrator OS is also connected to the base of an npn transistor Q5 through a resistor R11. The collector of the transistor Q5 is connected to the positive terminal of the battery B through a resistor R12. The emitter of the transistor Q5 is grounded.

The collector of the transistor Q5 is returned to ground through a capacitor C6. The junction of the capacitor C6 and the resistor R12 is connected to the reset input terminal of the flip-flop F1. The flip-flop F1 is reset, in a manner to appear, when the voltage across the capacitor C6 rises to a selected positive value. That value is selected, and the resistor R12 and the capacitor C6 correspondingly chosen, so that the flip-flop will be reset only when a selected interval after a pulse of the electrodes 1 and 3 has elapsed without another pulse appearing thereon.

The flip-flop F1 comprises two npn transistors Q6 and Q7 whose emitters are grounded. The collector of the transistor Q6 is returned to the positive terminal of the battery B through a resistor R14, and is connected to the base of the transistor Q7 through a resistor R15. Similarly, the collector of the transistor Q7 is connected to the base of the transistor Q6 through a resistor R16, and is returned to the positive terminal of the battery B through a resistor R17.

The flip-flop F1 is set through a diode D1 having its cathode connected to the junction of the resistor R13 and the capacitor C5, and its anode connected to the base of the transistor Q7. When a negative pulse appears across the resistor R13, the base-emitter junction of the transistor Q7 is reverse-biased, so that if conducting, the transistor will be cut off. When the transistor Q7 is cut off, the transistor Q6 will be turned on in a conventional manner.

The flip-flop F1 is reset through a threshold network comprising two diodes D2 and D3 connected in series between the base of the transistor Q7 and the junction of the resistor R12 and the capacitor C6. When the voltage across the capacitor C6 rises to a level sufficient to overcome the forward drops through the diodes D2 and D3 and the base-emitter junction of the transistor Q7, the transistor Q7 will be turned on, turning off the transistor Q6.

The collector of the transistor Q7, which serves as the logic 1 output terminal of the flip-flop F1, is connected to one input terminal of the gate G through a conventional inverting amplifier I. The gate G is thus enabled when the flip-flop is in its reset state.

At each pulse appearing between the electrodes 1 and 3, as described above, the multivibrator OS is triggered and produces an output pulse, enabling the gate G. If the flip-flop F1 is reset, the oscillator 5 will be reset and begin a new timing cycle as described above. On the other hand, if the flip-flop F1 is set, the oscillator 5 will continue its cycle until an output pulse is produced and applied through the capacitor C4 to the electrode 1.

When the multivibrator OS produces a pulse, the transistor Q5 is biased into conduction, and the capacitor C6 is discharged. At the trailing edge of the multivibrator pulse, the flip-flop F1 is set. The capacitor C6 then begins to charge through the resistor R12. The time constant R12 C6 is selected so that the flip-flop F1 will not be reset until a time has elapsed since it was set equal to the minimum acceptable period between naturally occurring heart pulses. If noise pulses occur at more frequent intervals, the capacitor C6 will be discharged through the transistor Q5 before the threshold value at which the flip-flop F1 is reset has been reached. Should an episode of heart block occur, the flip-flop F1 will be reset, but nothing further will occur until the oscillator 5 produces a stimulating pulse. Thus, the overall operation of the apparatus of FIG. 3 will be the same as that of the apparatus of FIG. 1.

Although I have described my invention with respect to the details of a preferred embodiment thereof, many changes and variations will occur to those skilled in the art upon reading my description, and such can obviously be made without departing from the scope of my invention.

Having thus described my invention, what I claim is:

1. A cardiac pacer normally responsive to natural heart stimulating pulses in its operation and adapted to provide artificial heart stimulating pulses independently of the natural pulses in the event of the presence of undesirable extraneous interference signals, comprising:
    means for receiving natural heart stimulating pulses;
    means for generating an artificial heart stimulating pulse after a first predetermined time interval relative to the last said natural pulse;
    means responsive to said natural pulses for disabling said artificial pulse generating means only after a second time interval, shorter than said first interval, relative to the last stimulating pulse, said disabling means including further means, disabled during said second time interval, for responding to a natural pulse derived signal only when said element is enabled in response to a signal derived after said second interval; and
    means for coupling said artificial pulse to a living heart.

2. The pacer of claim 1, wherein:
    said receiving means is adapted to receive said natural pulses above a predetermined threshold.

3. The pacer of claim 1, wherein:
    said first time interval is relative to the last said stimulating pulse.

4. The pacer of claim 1, wherein:
    said second interval is predetermined.

5. The pacer of claim 1, wherein:
    said further means enabling signal is derived independently of said natural pulse derived signal.

6. The pacer of claim 1, wherein:
    said disabling means includes timing means resettable in response to the last said stimulating pulse.

7. The pacer of claim 6, wherein:
    said timing means is reset slightly after the leading edge of the last said stimulating pulse.

8. The pacer of claim 1, wherein:
    said second interval is defined by a varying voltage relative to a fixed voltage and said further means enabling signal is derived from said varying voltage.

9. The pacer of claim 1, wherein:
    said further means include an AND gate.

10. The pacer of claim 1, wherein:
    said generating means, in the absence of natural pulses, tends to free-run at a fixed rate.

11. The pacer of claim 3, wherein:
    said further means enabling signal is derived independently of said natural pulse derived signal.

12. The pacer of claim 11, wherein:
    said disabling means includes timing means resettable in response to the last said stimulating pulse.

13. The pacer of claim 12, wherein:
    said second interval is defined by a varying voltage relative to a fixed voltage and said further means enabling signal is derived from said varying voltage.

14. The pacer of claim 13, wherein:
    said further means include an AND gate.

15. The pacer of claim 14, wherein:
    said generating means, in the absence of natural pulses, tends to free-run at a fixed rate.

16. The pacer of claim 15, wherein:

said second interval is predetermined.

17. The pacer of claim 16, wherein:

said timing means is reset slightly after the leading edge of the last said stimulating pulse.

* * * * *